United States Patent
Xu et al.

(10) Patent No.: US 12,101,802 B2
(45) Date of Patent: Sep. 24, 2024

(54) BWP SWITCHING METHOD AND TERMINAL DEVICE

(71) Applicant: GUANGDONG OPPO MOBILE TELECOMMUNICATIONS CORP., LTD., Guangdong (CN)

(72) Inventors: Weijie Xu, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 352 days.

(21) Appl. No.: 17/564,573

(22) Filed: Dec. 29, 2021

(65) Prior Publication Data

US 2022/0124722 A1 Apr. 21, 2022

Related U.S. Application Data

(63) Continuation of application No. PCT/CN2019/094950, filed on Jul. 5, 2019.

(51) Int. Cl.
*H04W 72/563* (2023.01)

(52) U.S. Cl.
CPC ................. *H04W 72/563* (2023.01)

(58) Field of Classification Search
CPC ............ H04W 72/563; H04W 72/542; H04W 72/02; H04W 72/0453; H04W 72/40; H04L 5/0007; H04B 7/1851; H04B 7/18541; H04B 7/2041
See application file for complete search history.

(56) References Cited

U.S. PATENT DOCUMENTS

| | | | |
|---|---|---|---|
| 2019/0149305 A1 | 5/2019 | Zhou et al. | |
| 2019/0150172 A1* | 5/2019 | Ang | H04W 72/1268 370/329 |
| 2019/0393969 A1* | 12/2019 | Kim | H04B 17/318 |
| 2020/0358504 A1* | 11/2020 | Takeda | H04B 7/0626 |
| 2020/0367079 A1* | 11/2020 | Chen | H04W 72/04 |

(Continued)

FOREIGN PATENT DOCUMENTS

| | | |
|---|---|---|
| CN | 109314972 | 2/2019 |
| CN | 109391965 | 2/2019 |
| CN | 109600845 | 4/2019 |

(Continued)

OTHER PUBLICATIONS

U.S. Appl. No. 62/804,454, filed Feb. 12, 2019 (Year: 2019).*

(Continued)

*Primary Examiner* — Ian N Moore
*Assistant Examiner* — Sun Jong Kim
(74) *Attorney, Agent, or Firm* — Hodgson Russ LLP

(57) ABSTRACT

A BWP switching method and a terminal device are provided. The method includes: measuring, by a terminal device, a plurality of downlink reference signals corresponding to a plurality of downlink BWPs; and determining, by the terminal device, whether to switch from a first downlink BWP to a second downlink BWP according to measurement results of the plurality of downlink reference signals corresponding to the plurality of downlink BWPs. The first downlink BWP is an active BWP, and the first downlink BWP and the second downlink BWP belong to the plurality of downlink BWPs.

17 Claims, 4 Drawing Sheets

(56) References Cited

U.S. PATENT DOCUMENTS

2021/0068121 A1* 3/2021 Cui .................. H04L 69/28
2021/0410186 A1* 12/2021 Hajir ................ H04W 74/0816

FOREIGN PATENT DOCUMENTS

| CN | 109803395 | 5/2019 |
| WO | 2019062899 | 4/2019 |
| WO | 2019084570 | 5/2019 |

OTHER PUBLICATIONS

EPO, Extended European Search Report for EP Application No. 19936802.8, Jun. 14, 2022.
WIPO, International Search Report and Written Opinion for International Application No. PCT/CN2019/094950, Mar. 27, 2020.

* cited by examiner

BWP SWITCHING METHOD AND TERMINAL DEVICE

CROSS REFERENCE

The present application is a continuation of International Patent Application No. PCT/CN2019/094950, filed on Jul. 5, 2019, the entire disclosure of which is incorporated herein by reference.

TECHNICAL FIELD

Embodiments of the present disclosure generally relate to the communication technical field, and more particularly, to a BWP switching method and a terminal device.

BACKGROUND

The New Radio (NR) system defines deployment scenarios for non-terrestrial networks (NTN) including satellite networks. A satellite can cover the ground with multiple beams to provide communication services for ground users. NR-based satellite communication can adopt a multi-color deployment mode, that is, different frequencies are used on adjacent beams of a satellite to avoid interference between the adjacent beams. However, due to the fast moving speed of satellites, the dwell time in a beam may be only a few seconds to tens of seconds, and thus fast beam switching is needed. Further, the switching of satellite beams leads to frequent passive switching of Band Width Part (BWP) of terminal devices, which affects the performance of satellite communication. How to optimize the impact of frequent BWP switching on satellite communication performance is an urgent problem to be solved.

SUMMARY

Embodiments of the present disclosure provide a BWP switching method and a terminal device, the terminal device can implement autonomous downlink BWP and/or uplink BWP switching based on measurement of downlink reference signals, thereby solving the problem in satellite communication that the satellite communication performance is influenced by the fast and frequent BWP switching caused by rapid switching of satellite beams.

According to a first aspect, there is provided a BWP switching method, including:

measuring, by a terminal device, a plurality of downlink reference signals corresponding to a plurality of downlink Bandwidth Parts (BWPs); and determining, by the terminal device, whether to switch from a first downlink BWP to a second downlink BWP according to measurement results of the plurality of downlink reference signals corresponding to the plurality of downlink BWPs, wherein the first downlink BWP is an active BWP, and the first downlink BWP and the second downlink BWP belong to the plurality of downlink BWPs.

According to second aspect, there is provided a terminal device configured to perform the method according to the first aspect or any implementation of the first aspect.

Specifically, the terminal device includes functional modules configured to perform the method according to the first aspect or any implementation of the first aspect.

According to a third aspect, there is provided a terminal device including a processor and a memory configured to store a computer program, wherein the processor is used to call and run the computer program stored in the memory to perform the method according to the first aspect or any implementation of the first aspect.

According to a fourth aspect, there is provided a chip configured to perform the method according to the first aspect or any implementation of the first aspect.

Specifically, the chip includes a processor configured to call and run a computer program stored in a memory to cause a device in which the chip is installed to perform the method according to the first aspect or any implementation of the first aspect.

According to a fifth aspect, there is provided a computer-readable storage medium configured to store a computer program, wherein the computer program is configured to cause a computer to perform the method according to the first aspect or any implementation of the first aspect.

According to a sixth aspect, there is provided a computer program product including computer program instructions that cause a computer to perform the method according to the first aspect or any implementation of the first aspect.

According to a seventh aspect, there is provided a computer program. When the computer program runs on a computer, the computer is caused to perform the method according to the first aspect or any implementation of the first aspect.

Using the above technical solutions, the terminal device can determine whether to switch from the currently activated first downlink BWP to the second downlink BWP according to the measurement results of the multiple downlink reference signals corresponding to the multiple downlink BWPs, thereby realizing autonomous downlink BWP switching. The technical solutions can solve the problem in satellite communication that the satellite communication performance is influenced by the fast and frequent BWP switching caused by rapid switching of satellite beams.

DETAILED DESCRIPTION

Technical solutions according to embodiments of the present disclosure will be described below in conjunction with the drawings. Obviously, the described embodiments are a part of the embodiments of the present disclosure, rather than all of the embodiments. All other embodiments obtained by those of ordinary skill in the art based on the described embodiments without creative work shall fall within the scope of protection of the present disclosure.

Embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), next-generation communication system or other communication systems, etc.

Generally speaking, traditional communication systems support a limited number of connections and are easy to implement. However, with the development of communication technologies, mobile communication systems will not only support traditional communications, but also support, for example, Device to Device (D2D) communications, Machine to Machine (M2M) communications, Machine Type Communication (MTC), and Vehicle to Vehicle (V2V) communications, etc. Embodiments of the present disclosure can be applied to these communications systems.

The communication systems in embodiments of the present disclosure can be applied to a Carrier Aggregation (CA) scenario, can also be applied to a Dual Connectivity (DC) scenario, and can also be applied to a standalone (SA) network deployment scenario.

The spectrum which embodiments of the present disclosure can be applied in is not limited. For example, embodiments of the present disclosure may be applied to licensed spectrum or unlicensed spectrum.

Figure 1:
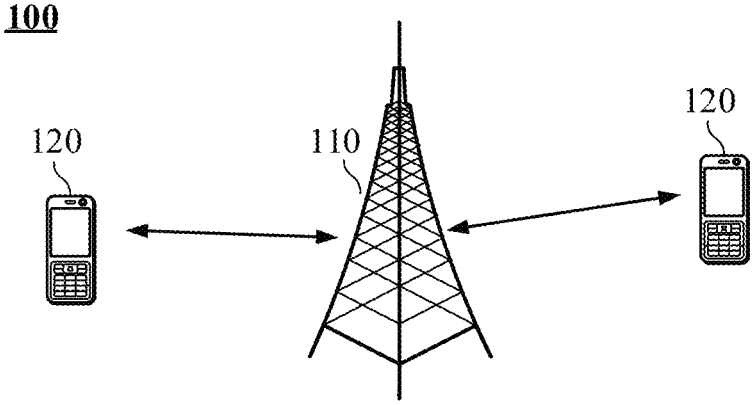
FIG. 1 is a schematic diagram of a communication system architecture according to an embodiment of the present disclosure.

Illustratively, a communication system 100 in which embodiments of the present disclosure are applied is shown in FIG. 1. The communication system 100 may include a network device 110. The network device 110 may be a device that communicates with a terminal device 120 (or called a communication terminal or a terminal). The network device 110 may provide communication coverage for a specific geographic area, and may communicate with terminal devices within the coverage area.

FIG. 1 exemplarily shows one network device and two terminal devices. According to some other embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller or a mobility management entity, which are not limited in embodiments of the present disclosure.

It should be understood that a device with a communication function in the network/system in embodiments of the present disclosure may be referred to as a communication device. Taking the communication system 100 shown in FIG. 1 as an example, the communication device may include the network device 110 and the terminal devices 120 which have a communication function. The network device 110 and the terminal devices 120 may be the specific devices described above, which will not be repeated here. The communication device may further include other devices in the communication system 100, such as a network controller, a mobility management entity, and other network entities, which are not limited in embodiments of the present disclosure.

It should be understood that the terms "system" and "network" are often used interchangeably herein. The term "and/or" is only an association relationship describing associated objects, which means that there can be three relationships, for example, A and/or B can mean the three situations: A alone, B alone, and A and B together. In addition, the character "/" generally indicates that the associated objects before and after "/" are in an "or" relationship.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc. The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device (gNB) in an NR network, or a network device in future evolved PLMN network.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

In the NR system, the system bandwidth and the terminal bandwidth may reach a bandwidth of hundreds of MHz or even several GHz to support high-speed mobile data transmission, but in actual data transmission, such a large bandwidth is not always required. For example, in a working scenario that only needs to support low data rate transmission (such as WeChat chatting scenario), a terminal only needs to use a small working bandwidth, for example, a bandwidth of 10 MHz is sufficient. In order to flexibly support the different bandwidth requirements for different scenarios, 5G introduces the concept of BWP. The BWP may be a part of the system bandwidth. For example, the system bandwidth is 100 MHz, and the terminal may use a bandwidth less than 100 MHz, for example, the bandwidth part of 20 or 50 MHz, to perform data transmission within the system bandwidth. NR supports the configuration of up to 4 BWPs for a terminal at the same time, and different BWPs can have different bandwidth sizes, different frequency positions, and different subcarrier spacing. The network can enable the terminal to switch between multiple BWPs according to the service requirements of the terminal. For example, a larger bandwidth BWP is used for higher service rate transmission, and a smaller bandwidth BWP is used for lower service data rate transmission.

The NR system currently supports the following two BWP switching methods:

The first method is to switch the BWP of a terminal through Downlink Control Information (DCI). The network carries a BWP indicator field (Bandwidth part indicator) in DCI for data scheduling for the terminal. When it is needed to perform BWP switching for the terminal, the network indicates a BWP different from the BWP where the terminal is currently located in the BWP indicator field in the DCI sent to the terminal. The terminal performs BWP switching after receiving the BWP.

The second method is to control BWP switching based on a timer. Every time the terminal receives a Physical Downlink Control Channel (PDCCH) scheduling in the current BWP, the timer is reset, and the timing continues. When the timer expires, the terminal switches to a default BWP.

Figure 2:
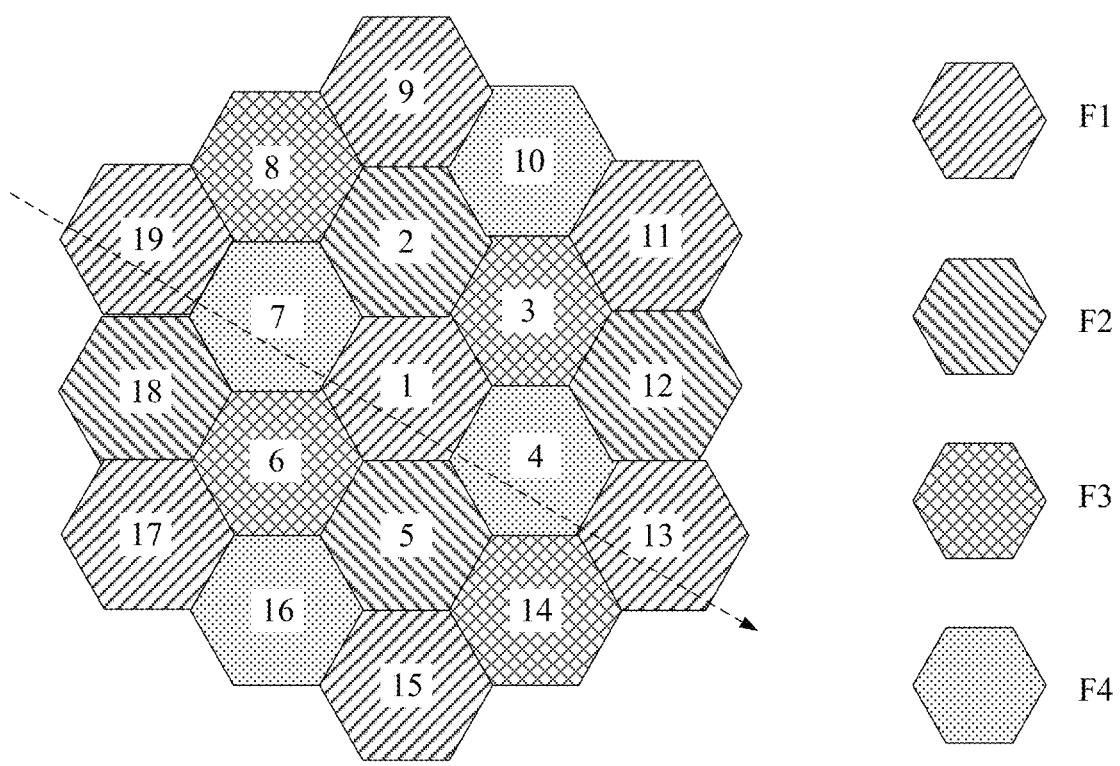
FIG. 2 is a schematic diagram of an implementation of multi-color deployment.

In the NR system, using satellite communication to provide users with communication services is considered. Multi-color deployment is a typical communication satellite deployment. The multi-color deployment can effectively avoid interference between two adjacent beams. However, in the satellite communications based on the NR system, if multi-color deployment is adopted, some new problems may arise. For low-Earth orbit satellites, due to the fast moving speed of the satellites, the dwell time of a terminal device in a beam may be only a few seconds to tens of seconds. Therefore, the terminal device faces fast beam switching. On the other hand, in the case of multi-color deployment, adjacent beams use different frequencies, and thus beam switching will also cause frequency switching. For a NR terminal in the connected state, the switching of the operating frequency may mean that the BWP of the terminal needs to be switched. Corresponding to the aforementioned satellite communication scenario, when the beam of the satellite communication is switched, the terminal may switch from the BWP corresponding to the working frequency of the previous beam to another BWP corresponding to the working frequency of the new beam. For example, as shown in FIG. 2, assuming that the terminal is currently in beam 4 (using frequency F4, assuming that it corresponds to BWP1), the satellite beam moves in the direction shown by the arrow and line segment, and then the terminal will subsequently use the working frequencies F1 and F4, respectively. It is assumed that F1 corresponds to BWP2, and the terminal subsequently needs to switch from F4's BWP1 to F1's BWP2, and switch from F1's BWP2 to F4's BWP1, and so on. It can be seen that the switching of the satellite beams results in frequent passive BWP switching of the terminal.

The timer-based method cannot be applied to the scenario where the switching of satellite beams leads to frequent passive BWP switching.

First, the beam switching time cannot be guaranteed to be consistent with the timer timeout time. Second, the BWP that the beam switching expects to switch to is not necessarily the default BWP.

The DCI-based BWP switching method cannot be applied to the scenario where the switching of satellite beams leads to frequent passive BWP switching.

First, the switching of the beam causes the terminals served in the beam to perform BWP switching. No matter whether the terminals have data transmission during the beam switching, the DCI for the BWP switching needs to be sent. This will cause the DCI overhead problem. When there are many users, this may lead to insufficient DCI.

Second, before the BWP switching, terminals need to report a measurement result. The network determines whether the beam has changed and whether to perform the BWP switching according to the change of the terminal measurement result. When it is determined that BWP switching is required, the DCI for BWP switching is sent to the terminals. In this process, if the terminals cannot report the measurement result in time and correctly due to the rapid weakening of the previous beam signal, the network cannot correctly determine whether to perform BWP switching, thereby leading to the delay of BWP switching, and accordingly affecting the normal communications of the terminals.

In view of the above problems, the present disclosure proposes a solution in which a terminal device performs autonomous downlink BWP switching and/or uplink BWP switching based on measurement of downlink reference signals, which can meet the demand for fast BWP switching caused by the fast switching of satellite beams in satellite communication, effectively save DCI overhead on the network side, and ensure more timely BWP switching due to reduction of the switching procedure based on terminal reporting.

The following describes in detail the BWP switching scheme designed by the present disclosure in view of the above technical problems.

Figure 3:
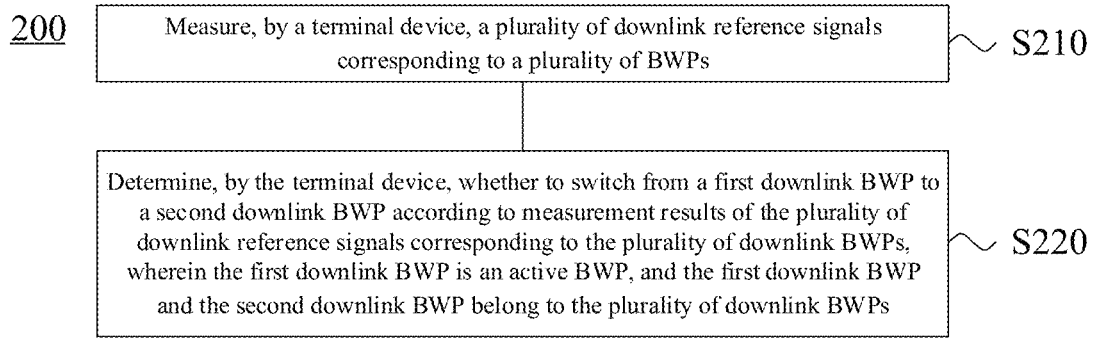
FIG. 3 is a schematic flowchart of a BWP switching method according to an embodiment of the present disclosure.

FIG. 3 is a schematic flowchart of a BWP switching method 200 according to an embodiment of the present disclosure. As shown in FIG. 3, the method 200 may include the following content:

In S210, a terminal device measures a plurality of downlink reference signals corresponding to a plurality of downlink Bandwidth Parts (BWPs).

In S220, the terminal device determines whether to switch from a first downlink BWP to a second downlink BWP according to measurement results of the plurality of downlink reference signals corresponding to the plurality of downlink BWPs. The first downlink BWP is an active BWP, and the first downlink BWP and the second downlink BWP belong to the plurality of downlink BWPs.

According to some embodiments, the multiple downlink BWPs may respectively correspond to one of frequencies in a multi-color deployment scenario in satellite communication. For example, satellite communication in the multi-color deployment scenario uses 4 different frequencies to cover the ground. The four frequencies are denoted as F1, F2, F3, and F4 respectively, F1 corresponds to BWP1, F2 corresponds to BWP2, F3 corresponds to BWP3, and F4 corresponds to BWP4.

It should be noted that the multiple downlink BWPs may be configured by a network device, and the number of the multiple downlink BWPs is less than or equal to 4, and each downlink BWP is located in a carrier bandwidth corresponding to a satellite beam.

In embodiments of the present disclosure, the multiple downlink reference signals corresponding to the multiple downlink BWPs include synchronization signal blocks or Channel State Information Reference Signals (CSI-RSs). Each of the synchronization signal block may be Synchronization Signal Block (SSB) or a Physical Broadcast Channel (PBCH) signal block.

It should be noted that each downlink BWP in the multiple downlink BWPs corresponds to one of the downlink reference signals. That is, the multiple downlink BWPs have a one-to-one correspondence with the multiple downlink reference signals. According to some other embodiments, the correspondence between the multiple downlink BWPs and the multiple downlink reference signals may be many-to-one, which is not limited in the embodiments of the present disclosure.

According to some embodiments, the multiple downlink reference signals corresponding to the multiple downlink BWPs are preset, or the multiple downlink reference signals corresponding to the multiple downlink BWPs are pre-configured by the network device through a signaling.

For example, the network device sends first configuration information to the terminal device through a signaling in advance, and the first configuration information is used to configure the multiple downlink reference signals corresponding to the multiple downlink BWPs.

In embodiments of the present disclosure, the measurement results include but is not limited to at least one of the following:

Reference Signal Receiving Powers (RSRPs) corresponding to the BWPs, Reference Signal Receiving Qualities (RSRQs) corresponding to the BWPs, Reference Signal Carrier to Interference plus Noise Ratio (RS-SINR) corresponding to the BWPs, Channel Quality Indicators (CQIs) corresponding to the BWPs.

According to some embodiments, the foregoing step S210 may specifically be:

The terminal device periodically measures multiple downlink reference signals corresponding to the multiple downlink BWPs.

According to some embodiments, the measurement periods for the multiple downlink reference signals corresponding to the multiple downlink BWPs are preset, or the measurement periods for the multiple downlink reference signals corresponding to the multiple downlink BWPs are pre-configured by the network device through a signaling.

For example, the network device sends second configuration information to the terminal device through a signaling in advance, and the second configuration information is used to configure the measurement periods for the multiple downlink reference signals corresponding to the multiple downlink BWPs.

Figure 4:
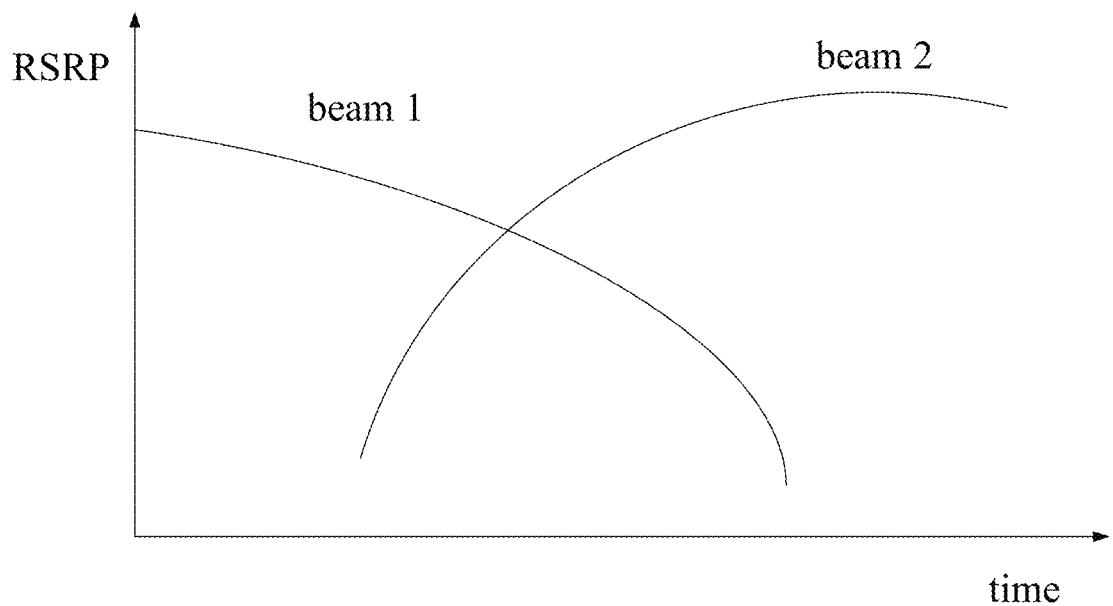
FIG. 4 is a schematic diagram of a signal intensity change corresponding to a BWP of a beam caused by satellite movement according to an embodiment of the present disclosure.

It should be noted that the terminal device can evaluate the change trend of the signal strengths of the downlink BWPs based on the periodic measurement of the downlink reference signals corresponding to the multiple downlink BWPs corresponding to the multiple satellite beams, and thus determines the switching trend of the satellite beams. As shown in FIG. 4, with the rapid movement of the satellite, the RSRP signal strength corresponding to the downlink BWP of beam 1 gradually decreases, and the RSRP signal strength corresponding to the downlink BWP of beam 2 gradually increases. Therefore, the terminal device can perform downlink BWP switching based on the relative relationship between the measurement results of the multiple downlink BWPs.

According to some embodiments, the measurement result of the downlink reference signal corresponding to the second downlink BWP is the largest among the measurement results of the multiple downlink reference signals corresponding to the multiple downlink BWPs.

According to some embodiments, the foregoing step S220 may specifically be:

if the measurement result of the downlink reference signal corresponding to the second downlink BWP is greater than the measurement result of the downlink reference signal corresponding to the first downlink BWP, the terminal device switches from the first downlink BWP to the second downlink BWP.

Of course, if the measurement result of the downlink reference signal corresponding to the second downlink BWP is less than or equal to the measurement result of the downlink reference signal corresponding to the first downlink BWP, the terminal device does not switch from the first downlink BWP to the second downlink BWP.

For example, the multiple downlink BWPs include a downlink BWP1, a downlink BWP2, a downlink BWP3, and a downlink BWP4. The downlink BWP1 is the active BWP. The measurement result of the downlink reference signal corresponding to the downlink BWP1 is A, the measurement result of the downlink reference signal corresponding to the downlink BWP2 is B, the measurement result of the downlink reference signal corresponding to the downlink BWP3 is C, and the measurement result of the downlink reference signal corresponding to the downlink BWP4 is D. If B is greater than A, the terminal device determines to switch from downlink BWP1 to downlink BWP2; if C is greater than A, the terminal device determines to switch from downlink BWP1 to downlink BWP3; if D is greater than A, the terminal device determines to switch from downlink BWP1 to downlink BWP4. If B and C are both greater than A, and C is greater than B, the terminal device determines to switch from downlink BWP1 to downlink BWP3.

According to some embodiments, the foregoing step S220 may specifically be:

if a difference between the measurement result of the downlink reference signal corresponding to the second downlink BWP and the measurement result of the downlink reference signal corresponding to the first downlink BWP is greater than a first threshold, the terminal device switches from the first downlink BWP To the second downlink BWP.

Of course, if the difference between the measurement result of the downlink reference signal corresponding to the second downlink BWP and the measurement result of the downlink reference signal corresponding to the first downlink BWP is less than or equal to the first threshold, the terminal device does not switch from the first downlink BWP to the second downlink BWP.

It should be understood that the difference between the measurement result of the downlink reference signal corresponding to the second downlink BWP and the measurement result of the downlink reference signal corresponding to the first downlink BWP can be understood as a difference obtained by subtracting the measurement result of the downlink reference signal corresponding to the first downlink BWP from the measurement result of the downlink reference signal corresponding to the second downlink BWP.

According to some embodiments, the first threshold is preset, or the first threshold is pre-configured by the network device through a signaling.

For example, the network device sends third configuration information to the terminal device through a signaling in advance, and the third configuration information is used to configure the first threshold.

For example, the multiple downlink BWPs include a downlink BWP1, a downlink BWP2, a downlink BWP3, and a downlink BWP4. The downlink BWP1 is the active BWP. The measurement result of the downlink reference signal corresponding to the downlink BWP1 is A, the measurement result of the downlink reference signal corresponding to the downlink BWP2 is B, the measurement result of the downlink reference signal corresponding to the downlink BWP3 is C, and the measurement result of the downlink reference signal corresponding to the downlink BWP4 is D. If B-A>the first threshold, the terminal device determines to switch from downlink BWP1 to downlink BWP2; if C-A>the first threshold, the terminal device determines to switch from downlink BWP1 to downlink BWP3; if D-A>the first threshold, the terminal device determines to switch from downlink BWP1 to downlink BWP4. If B-A>the first threshold, C-A>the first threshold, and C>B, the terminal device determines to switch from the downlink BWP1 to the downlink BWP3.

In embodiments of the present disclosure, the change of the satellite beams will not only cause the change of downlink frequencies and the change of downlink BWPs, but also cause the change of uplink frequencies and uplink BWP switching. Therefore, in order to ensure that both the uplink BWP switching and downlink BWP switching are correct, the uplink BWPs and downlink BWPs of the satellite beam can be associated. For example, in the Frequency Division Duplexing frequency band, the uplinks BWP are associated with the downlink BWPs. When the downlink BWP switching of the satellite is performed, the corresponding uplink BWP switching is performed.

In embodiments of the present disclosure, after the terminal device determines whether to perform downlink BWP switching, the terminal device may also determine whether to perform uplink BWP switching.

According to some embodiments, if the terminal device determines to switch from the first downlink BWP to the second downlink BWP, the terminal device may determine to switch from an uplink BWP corresponding to the first downlink BWP to an uplink BWP corresponding to the second downlink BWP according to a third correspondence. The third correspondence is a correspondence between the multiple downlink BWPs and multiple uplink BWPs.

For example, the third correspondence may be as shown in Table 1 below:

TABLE 1 association relationship between downlink BWPs and uplink BWPs

|  | downlink BWP index | | |
| --- | --- | --- | --- |
|  | 1 | 2 | 3 |
| uplink BWP index | 1 | 2 | 3 |

According to some embodiments, the third correspondence is preset, or the third correspondence is pre-configured by the network device through a signaling.

For example, the network device sends fourth configuration information to the terminal device through a signaling in advance, and the fourth configuration information is used to configure the third correspondence.

In embodiments of this application, since the terminal device autonomously performs the uplink BWP switching and/or the downlink BWP switching, the network device is not aware of the BWP switching status of the terminal device. In order to ensure the correct communication between the network device and the terminal device, the terminal device needs to timely repot the situation of the BWP switching to the network device.

In embodiments of the present disclosure, if the terminal device determines to switch from the first downlink BWP to the second downlink BWP, before the terminal device switches from the first downlink BWP to the second downlink BWP, the terminal device sends a first uplink signal to the network device to indicate information of the second downlink BWP, and/or, to indicate the information of an uplink BWP corresponding to the second downlink BWP.

According to some embodiments, the first uplink signal includes index information of the second downlink BWP. That is, the terminal device can explicitly indicates the switching from the first downlink BWP to the second downlink BWP by the terminal device through the index information of the second downlink BWP. Further, since the third correspondence exists between the downlink BWPs and the uplink BWPs, the terminal device may explicitly indicates through the index information of the second downlink BWP that the terminal device switches from the uplink BWP corresponding to the first downlink BWP to the uplink BWP corresponding to the second downlink BWP.

According to some embodiments, the first uplink signal includes index information of the uplink BWP corresponding to the second downlink BWP. That is, the terminal device can explicitly indicates through the index information of the uplink BWP corresponding to the second downlink BWP that the terminal device switches from the uplink BWP corresponding to the first downlink BWP to the uplink BWP corresponding to the second downlink BWP.

According to some embodiments, the terminal device sends the first uplink signal on the uplink BWP corresponding to the first downlink BWP according to a first correspondence. The first uplink signal corresponds to the index information of the second downlink BWP. The first correspondence is a correspondence between a plurality of pieces of uplink information and indexes of the plurality of downlink BWPs, and the plurality of pieces of uplink information includes the first uplink signal.

That is, by the sending of the first uplink signal, the terminal device can implicitly indicates that the terminal device switches from the first downlink BWP to the second downlink BWP. Further, since the third corresponding relationship exists between the downlink BWPs and the uplink BWPs, the terminal device can implicitly indicate by sending of the first uplink signal that the terminal device switches from the uplink BWP corresponding to the first downlink BWP to the uplink BWP corresponding to the second downlink BWP.

For example, the first correspondence may be as shown in Table 2 or Table 3 below.

TABLE 2 an association relationship between indexes of uplink signals and downlink BWPs

| | uplink signal index | | |
|---|---|---|---|
| | uplink signal a | uplink signal b | uplink signal c |
| downlink BWP index | downlink BWP a | downlink BWP b | downlink BWP c |

TABLE 3 an association relationship between BWPs

| | uplink signal index | | |
|---|---|---|---|
| | uplink signal a | uplink signal b | uplink signal c |
| downlink BWP index | downlink BWP a | downlink BWP b | downlink BWP c |
| uplink BWP index | uplink BWP a | uplink BWP b | uplink BWP c |

According to some embodiments, the first correspondence is preset, or the first correspondence is pre-configured by the network device through a signaling.

For example, the network device sends fifth configuration information to the terminal device through a signaling in advance, and the fifth configuration information is used to configure the first correspondence.

According to some embodiments, the first uplink signal is one of the following:
- a random access preamble, a dedicated Scheduling Request (SR), a dedicated Sounding Reference Signal (SRS), a Media Access Control Control Element (MAC CE) signaling, or a Radio Resource Control (RRC) message.

According to some embodiments, the terminal device receives configuration information of the first uplink signal sent by the network device. Thus, the first uplink signal and the resource for transmitting the first uplink signal can be determined.

For example, in a case where the measurement result of the downlink reference signal corresponding to the first downlink BWP is less than a second threshold, the terminal device receives the configuration information of the first uplink signal sent by the network device. That is, after the condition is triggered, the network device sends the configuration information of the first uplink signal.

According to some embodiments, the second threshold may be preset or pre-configured by the network device through a signaling.

In embodiments of the present disclosure, if the terminal device determines to switch from the first downlink BWP to the second downlink BWP, the terminal device sends a second uplink signal to the network device to indicate information of the second downlink BWP and/or to indicate information of an uplink BWP corresponding to the second downlink BWP after the terminal device switches from the first downlink BWP to the second downlink BWP.

According to some embodiments, the second uplink signal includes index information of the second downlink BWP and/or index information of the uplink BWP corresponding to the second downlink BWP. That is, the terminal device can explicitly indicates through the index information of the second downlink BWP that the terminal device switches from the first downlink BWP to the second downlink BWP. Further, since the third correspondence exists between the downlink BWPs and the uplink BWPs, the terminal device may explicitly indicate, through the index information of the second downlink BWP, that the terminal device switches from the uplink BWP corresponding to the first downlink BWP to the uplink BWP corresponding to the second downlink BWP.

According to some embodiments, the terminal device sends the second uplink signal on the uplink BWP corresponding to the second downlink BWP. That is, the sending of the second uplink signal on the uplink BWP corresponding to the second downlink BWP by the terminal device can implicitly indicate that terminal device switches from the first downlink BWP to the second downlink BWP, and can implicitly indicates that the terminal device switches from the uplink BWP corresponding to the first downlink BWP to the uplink BWP corresponding to the second downlink BWP.

According to some embodiments, the terminal device sends the second uplink signal on the uplink BWP corresponding to the second downlink BWP according to a second correspondence. The the second uplink signal corresponds to index information of the second downlink BWP, and the second correspondence is a correspondence between a plurality of pieces of uplink information and indexes of the plurality of downlink BWPs, and the plurality of pieces of uplink information includes the second uplink signal.

That is, the sending of the second uplink signal by the terminal device can implicitly indicate that the terminal device switches from the first downlink BWP to the second downlink BWP. Further, since the third correspondence exists between the downlink BWPs and the uplink BWPs, the sending of the second uplink signal by the terminal device can implicitly indicate that the terminal device switches from the uplink BWP corresponding to the first downlink BWP to the uplink BWP corresponding to the second downlink BWP.

For example, the second correspondence may be as shown in Table 4 or Table 5.

TABLE 4 an association relationship between indexes of uplink signals and downlink BWPs

| | uplink signal index | | |
|---|---|---|---|
| | uplink signal 1 | uplink signal 2 | uplink signal 3 |
| downlink BWP index | downlink BWP 1 | downlink BWP 2 | downlink BWP 3 |

TABLE 5 an association relationship between indexes of uplink signals and BWPs

| | uplink signal index | | |
|---|---|---|---|
| | uplink signal 1 | uplink signal 2 | uplink signal 3 |
| downlink BWP index | downlink BWP 1 | downlink BWP 2 | downlink BWP 3 |
| uplink BWP index | uplink BWP 1 | uplink BWP 2 | uplink BWP 3 |

According to some embodiments, the second correspondence is preset, or the second correspondence is pre-configured by the network device through a signaling.

For example, the network device sends sixth configuration information to the terminal device through a signaling in advance, and the sixth configuration information is used to configure the second correspondence.

According to some embodiments, the second uplink signal is one of the following:

a random access preamble, a dedicated SR, a dedicated SRS, a MAC CE signaling or a RRC message.

According to some embodiments, the terminal device receives configuration information of the second uplink signal. Thus, the second uplink signal and the resource for transmitting the second uplink signal can be determined.

For example, in a case where the measurement result of the downlink reference signal corresponding to the first downlink BWP is less than the third threshold, the terminal device receives the configuration information of the second uplink signal. That is, after the condition is triggered, the network device sends the configuration information of the second uplink signal.

In some embodiments of the present disclosure, since the second uplink signal configured by the network device cannot be guaranteed to appear in every uplink time slot, there may be a certain interval between the time point when the terminal device determines that BWP switching can be performed and the time point when the second uplink signal is sent. If the terminal device performs the BWP switching at the time when it is determined that the BWP switching can be performed, it may result in a certain time interval between the time point when the BWP switching is performed and the time point when the second uplink signal is sent. The terminal device and the network device have inconsistent understanding as to the current working BWP. Therefore, in order to maintain the consistency of understanding as to the active BWP between the network device and the terminal device, the terminal device needs to start performing BWP switching a period of time before sending of the second uplink signal to the network device.

Figure 5:
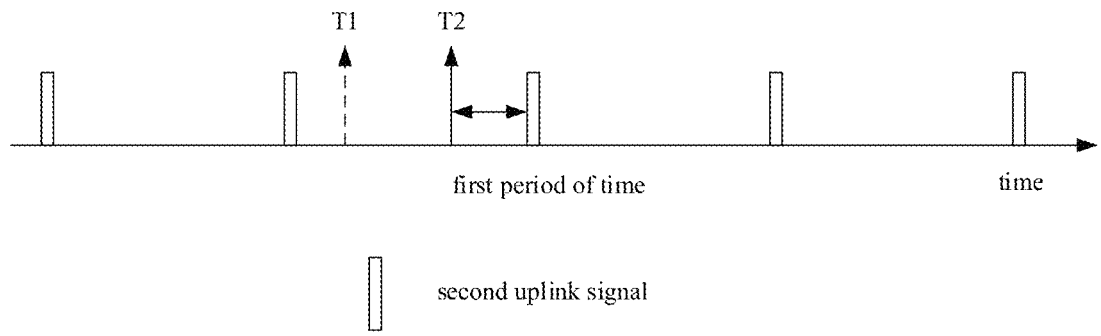
FIG. 5 is a schematic diagram of a first period of time according to an embodiment of the present disclosure.

In embodiments of the present disclosure, there is a first period of time between the start time when the terminal device switches from the first downlink BWP to the second downlink BWP and the start time when the second uplink signal is sent. For example, as shown in FIG. 5, the terminal device determines to switch from downlink BWP1 to downlink BWP2 at time T1, and switches from downlink BWP1 to downlink BWP2 at time T2, and starts to send the second uplink signal to the network device a first period of time after the time T2.

It should be noted that the first period of time may be the maximum time to ensure that the terminal device starts downlink BWP switching to the end of the downlink BWP switching.

According to some embodiments, the first period of time is preset, or the first period of time is pre-configured by the network device through a signaling.

For example, the network device sends seventh configuration information to the terminal device through a signaling in advance, and the seventh configuration information is used to configure the first period of time.

In view of the above, in the embodiments of the present disclosure, the terminal device autonomously performs the downlink BWP switching and/or the uplink BWP switching based on the measurement of the downlink reference signals, which can meet the demand for fast switching of BWP caused by the fast switching of satellite beams in satellite communications, effectively save DCI overhead on the network side, and ensure more timely BWP switching due to reduction of the switching procedure based on terminal reporting.

Figure 6:
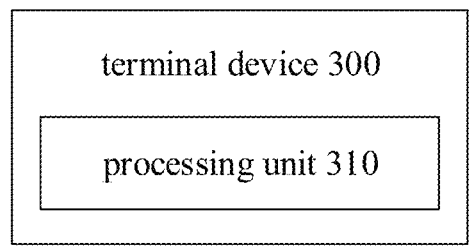
FIG. 6 is a schematic block diagram of a terminal device according to an embodiment of the present disclosure.

FIG. 6 is a schematic block diagram of a terminal device 300 according to an embodiment of the present disclosure. The terminal device 300 includes a processing unit 310.

The processing unit 310 is configured to measure a plurality of downlink reference signals corresponding to a plurality of downlink BWPs.

The processing unit 310 is further configured to determine whether to switch from a first downlink BWP to a second downlink BWP according to measurement results of the plurality of downlink reference signals corresponding to the plurality of downlink BWPs. The first downlink BWP is an active BWP, and the first downlink BWP and the second downlink BWP belong to the plurality of downlink BWPs.

According to some embodiments, the measurement results include at least one of:

RSRPs corresponding to the BWPs, RSRQs corresponding to the BWPs, RS-SINRs corresponding to the BWPs, and CQIs corresponding to the BWPs.

According to some embodiments, the processing unit 310 is configured to:

switch from the first downlink BWP to the second downlink BWP in response to a measurement result of a downlink reference signal corresponding to the second downlink BWP being greater than a measurement result of a downlink reference signal corresponding to the first downlink BWP.

According to some embodiments, the processing unit 310 is configured to:

switch from the first downlink BWP to the second downlink BWP in response to a difference between a measurement result of a downlink reference signal corresponding to the second downlink BWP and a measurement result of a downlink reference signal corresponding to the first downlink BWP being greater than a first threshold.

According to some embodiments, the first threshold is preset, or the first threshold is pre-configured by a network device through signaling.

According to some embodiments, the measurement result of the downlink reference signal corresponding to the second downlink BWP is the largest among the measurement results of the plurality of downlink reference signals corresponding to the plurality of downlink BWPs.

According to some embodiments, in response to determination of switching from the first downlink BWP to the second downlink BWP by the terminal device, the terminal device further includes:

a communication unit 320 configured to, before the terminal device switches from the first downlink BWP to the second downlink BWP, send a first uplink signal to indicate information of the second downlink BWP, and/or to indicate information of an uplink BWP corresponding to the second downlink BWP.

According to some embodiments, the first uplink signal includes index information of the second downlink BWP and/or index information of the uplink BWP corresponding to the second downlink BWP.

According to some embodiments, the communication unit 320 is configured to:

send the first uplink signal on an uplink BWP corresponding to the first downlink BWP according to a first correspondence, wherein the first uplink signal corresponds to index information of the second downlink BWP, the first correspondence is a correspondence between a plurality pieces of uplink information and indexes of the plurality of downlink BWPs, and the plurality of pieces of uplink information includes the first uplink signal.

According to some embodiments, the first correspondence is preset, or the first correspondence is pre-configured by a network device through a signaling.

According to some embodiments, the first uplink signal is one of:

a random access preamble, a dedicated SR, a dedicated SRS, a MAC CE signaling or a RRC message.

According to some embodiments, the communication unit 320 is further configured to:

receive configuration information of the first uplink signal.

According to some embodiments, the communication unit 320 is configured to:

in a case where a measurement result of a downlink reference signal corresponding to the first downlink BWP is smaller than a second threshold, receive the configuration information of the first uplink signal.

According to some embodiments, in response to determination of switching from the first downlink BWP to the second downlink BWP by the terminal device, the terminal device further includes:

a communication unit 320 configured to, after the terminal device switches from the first downlink BWP to the second downlink BWP, send a second uplink signal to indicate information of the second downlink BWP, and/or to indicate information of an uplink BWP corresponding to the second downlink BWP.

According to some embodiments, the second uplink signal includes index information of the second downlink BWP and/or index information of the uplink BWP corresponding to the second downlink BWP.

According to some embodiments, the communication unit 320 is configured to:

send the second uplink signal on an uplink BWP corresponding to the second downlink BWP.

According to some embodiments, the communication unit 320 is configured to:

send the second uplink signal on an uplink BWP corresponding to the second downlink BWP according to a second correspondence, wherein the second uplink signal corresponds to index information of the second downlink BWP, the second correspondence is a correspondence between a plurality of pieces of uplink information and indexes of the plurality of downlink BWPs, and the plurality of pieces of uplink information include the second uplink signal.

According to some embodiments, the second correspondence is preset, or the second correspondence is pre-configured by a network device through a signaling.

According to some embodiments, the second uplink signal is one of:

a random access preamble, a dedicated SR, a dedicated SRS, a MAC CE signaling or a RRC message.

According to some embodiments, the communication unit 320 is further configured to:

receive configuration information of the second uplink signal.

According to some embodiments, the communication unit 320 is configured to:

in the case where a measurement result of a downlink reference signal corresponding to the first downlink BWP is smaller than a third threshold, receive the configuration information of the second uplink signal.

According to some embodiments, there is a first period of time between a start time when the terminal device 300 switches from the first downlink BWP to the second downlink BWP and a start time when the second uplink signal is sent.

According to some embodiments, the first period of time is preset, or the first period of time is pre-configured by a network device through a signaling.

According to some embodiments, the plurality of downlink reference signals corresponding to the plurality of downlink BWPs are preset, or the plurality of downlink reference signals corresponding to the plurality of downlink BWPs are pre-configured by a network device through a signaling.

According to some embodiments, the processing unit 310 is configured to:

periodically measure the plurality of downlink reference signals corresponding to the plurality of downlink BWPs.

According to some embodiments, measurement periods for the plurality of downlink reference signals corresponding to the plurality of downlink BWPs are preset, or the measurement periods for the plurality of downlink reference signals corresponding to the plurality of downlink BWPs are pre-configured by a network device through a signaling.

According to some embodiments, the processing unit 310 is further configured to:

determine whether to perform uplink BWP switching.

According to some embodiments, the processing unit 310 is configured to:

in response to that the terminal device determines to switch from the first downlink BWP to the second downlink BWP, determine to switch from an uplink BWP corresponding to the first downlink BWP to an uplink BWP corresponding to the second downlink BWP according to a third correspondence, wherein the third correspondence is a correspondence between the plurality of downlink BWPs and a plurality of uplink BWPs.

According to some embodiments, the third correspondence is preset, or the third correspondence is pre-configured by a network device through a signaling.

According to some embodiments, the plurality of downlink reference signals corresponding to the plurality of downlink BWPs include synchronization signal blocks or CSI-RSs.

It should be understood that the terminal device 300 according to the embodiments of the present disclosure may correspond to the terminal device in the method embodiments of the present disclosure, and the above and other operations and/or functions of each unit in the terminal device 300 are used to implement the corresponding processes in the method shown in FIG. 3 performed by the terminal device. For the sake of brevity, repeated descriptions are omitted here.

Figure 7:
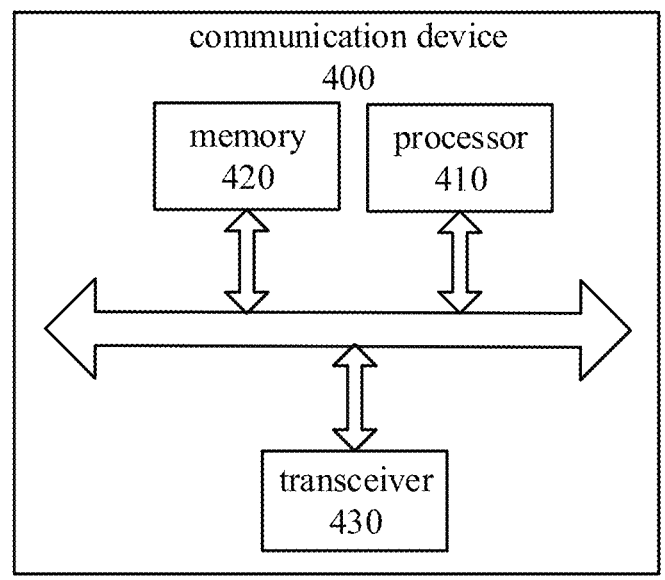
FIG. 7 is a schematic block diagram of a communication device according to an embodiment of the present disclosure.

FIG. 7 is a schematic structural diagram of a communication device 400 according to an embodiment of the present disclosure. The communication device 400 shown in FIG. 7 includes a processor 410, and the processor 410 may call and run a computer program from a memory to perform the method in embodiments of the present disclosure.

According to embodiments, as shown in FIG. 7, the communication device 400 may further include a memory 420. The processor 410 may call and run a computer program from the memory 420 to perform the method in embodiments of the present disclosure.

The memory 420 may be a separate device independent of the processor 410, or may be integrated in the processor 410.

According to embodiments, as shown in FIG. 7, the communication device 400 may further include a transceiver 430, and the processor 410 may control the transceiver 430 to communicate with other devices. Specifically, the transceiver may send information or data to other devices, or receive information or data sent by other devices.

The transceiver 430 may include a transmitter and a receiver. The transceiver 430 may further include one or more antennas.

According to embodiments, the communication device 400 may specifically be the network device according to embodiments of the present disclosure, and the communication device 400 may implement the corresponding processes implemented by the network device in the method embodiments of the present disclosure.

According to embodiments, the communication device 400 may specifically be the terminal device according to embodiments of the present disclosure, and the communication device 400 may implement the corresponding processes implemented by the first terminal device in the method embodiments of the present disclosure.

Figure 8:
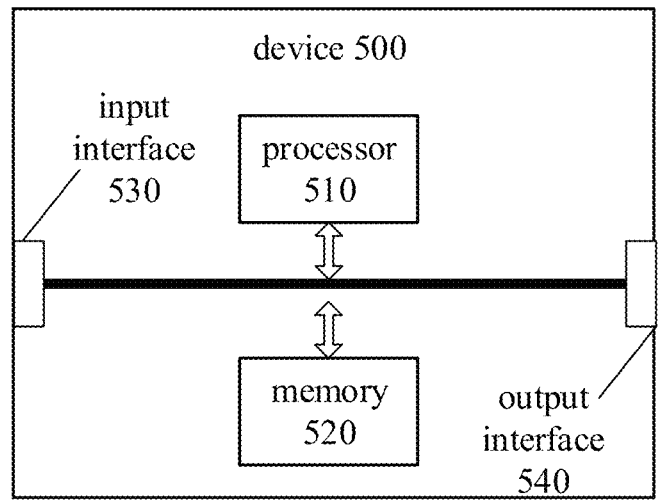
FIG. 8 is a schematic block diagram of a chip according to an embodiment of the present disclosure.

FIG. 8 is a schematic structural diagram of a device according to an embodiment of the present disclosure. The device 500 shown in FIG. 8 includes a processor 510, and the processor 510 can call and run a computer program from a memory to implement the method according to embodiments of the present disclosure.

According to embodiments, as shown in FIG. 8, the device 1000 may further include a memory 520. The processor 510 may call and run a computer program from the memory 520 to implement the method according to embodiments of the present disclosure.

The memory 520 may be a separate device independent of the processor 510, or may be integrated in the processor 510.

According to embodiments, the device 500 may further include an input interface 530. The processor 510 may control the input interface 530 to communicate with other devices or chips, and specifically, the processor 510 can control the input interface to obtain information or data sent by other devices or chips.

According to embodiments, the device 500 may further include an output interface 540. The processor 510 can control the output interface 540 to communicate with other devices or chips, and specifically, the processor 510 can control the output interface 1040 to output information or data to other devices or chips.

According to embodiments, the device can be applied to the network device in embodiments of the present disclosure, and the device can implement the corresponding processes implemented by the network device in various methods according to embodiments of the present disclosure. For brevity, details are not repeated herein again.

According to embodiments, the device can be applied to the terminal device in embodiments of the present disclosure, and the device can implement the corresponding processes implemented by the first terminal device in various methods according to embodiments of the present disclosure. For brevity, details are not repeated herein again.

According to some embodiments, the device in the above embodiments may be a chip, for example, a system-level chip, a system chip, a chip system, or a system-on-chip, etc.

Figure 9:
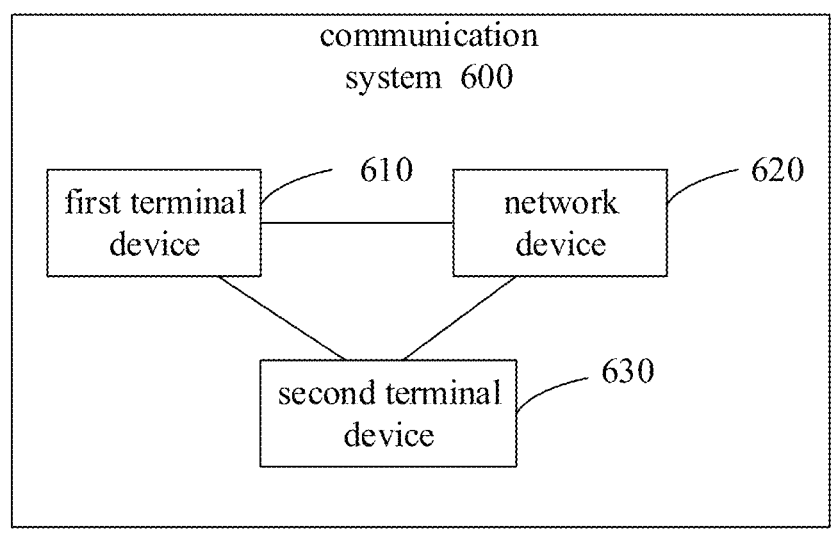
FIG. 9 is a schematic block diagram of a communication system according to an embodiment of the present disclosure.

FIG. 9 is a schematic block diagram of a communication system according to an embodiment of the present disclosure. As shown in FIG. 9, the communication system 600 includes a first terminal device 610, a network device 620, and a second terminal device 630.

The first terminal device 610 can be used to implement the corresponding functions implemented by the first terminal device in the above method embodiments, and the network device 620 can be used to implement the corresponding functions implemented by the network device in the above method embodiments, and the first terminal device 610 communicates with the second terminal device 630 via a sidelink. The second terminal device 630 can be used to implement the corresponding functions implemented by the second terminal device in the above method embodiments. For the sake of brevity, repeated descriptions are omitted here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EE-PROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the terminal device in embodiments of the present disclosure, and the computer programs cause a computer to perform the corresponding processes implemented by the first terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the terminal device in embodiments of the present disclosure, and the computer program instructions cause a computer to perform the corresponding processes implemented by the first terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the terminal device in embodiments of the present disclosure, and when the computer program runs on a computer, the computer is caused to perform the corresponding processes implemented by the first terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A BWP switching method, comprising:
measuring, by a terminal device, a plurality of downlink reference signals corresponding to a plurality of downlink Bandwidth Parts (BWPs); and
determining, by the terminal device, whether to switch from a first downlink BWP to a second downlink BWP according to measurement results of the plurality of downlink reference signals corresponding to the plurality of downlink BWPs, wherein the first downlink BWP is an active BWP, and the first downlink BWP and the second downlink BWP belong to the plurality of downlink BWPs;
wherein determining, by the terminal device, whether to switch from the first downlink BWP to the second downlink BWP according to the measurement results of the plurality of downlink reference signals corresponding to the plurality of downlink BWPs comprises:
switching, by the terminal device, from the first downlink BWP to the second downlink BWP in response to a difference between a measurement result of a downlink reference signal corresponding to the second downlink BWP and a measurement result of a downlink reference signal corresponding to the first downlink BWP being greater than a first threshold.

2. The method according to claim 1, wherein the measurement results comprise at least one of:
Reference Signal Received Powers (RSRPs) corresponding to the BWPs, Reference Signal Received Qualities (RSRQs) corresponding to the BWPs, Reference Signal Signal Interference Noise Ratios (RS-SINRs) corresponding to the BWPs, and Channel Quality Indicators (CQIs) corresponding to the BWPs.

3. The method according to claim 1, wherein in response to determination of switching from the first downlink BWP to the second downlink BWP by the terminal device, the method further comprises:
before the terminal device switches from the first downlink BWP to the second downlink BWP, sending, by the terminal device, a first uplink signal to indicate at least one of: information of the second downlink BWP, or information of an uplink BWP corresponding to the second downlink BWP.

4. The method according to claim 3, wherein the first uplink signal comprises at least one of: index information of the second downlink BWP; or index information of the uplink BWP corresponding to the second downlink BWP.

5. The method according to claim 3, wherein sending the first uplink signal by the terminal device comprises:
sending, by the terminal device, the first uplink signal on an uplink BWP corresponding to the first downlink BWP according to a first correspondence, wherein the first uplink signal corresponds to index information of the second downlink BWP, the first correspondence is a correspondence between a plurality pieces of uplink information and indexes of the plurality of downlink BWPs, and the plurality of pieces of uplink information comprise the first uplink signal.

6. The method according to claim 3, further comprising:
receiving, by the terminal device, configuration information of the first uplink signal.

7. The method according to claim 6, wherein receiving the configuration information of the first uplink signal by the terminal device comprises:
in response to that a measurement result of a downlink reference signal corresponding to the first downlink BWP is smaller than a second threshold, receiving, by the terminal device, the configuration information of the first uplink signal.

8. A terminal device, comprising:
a processor; and
memory comprising computer program codes;
wherein said computer program codes are configured to, when executed by the processor, cause said terminal device to perform:
measuring a plurality of downlink reference signals corresponding to a plurality of downlink Bandwidth Parts (BWPs);
determining whether to switch from a first downlink BWP to a second downlink BWP according to measurement results of the plurality of downlink reference signals corresponding to the plurality of downlink BWPs, wherein the first downlink BWP is an active BWP, and the first downlink BWP and the second downlink BWP belong to the plurality of downlink BWPs;
wherein said computer program code are configured to, when executed by the processor, cause said terminal device to:
switch from the first downlink BWP to the second downlink BWP in response to a difference between a measurement result of a downlink reference signal corresponding to the second downlink BWP and a measurement result of a downlink reference signal corresponding to the first downlink BWP being greater than a first threshold.

9. The terminal device according to claim 8, wherein said computer program codes are further configured to, when executed by the processor, cause said terminal device to:
in response to determination of switching from the first downlink BWP to the second downlink BWP by the terminal device, and after the terminal device switches from the first downlink BWP to the second downlink BWP, send a second uplink signal to indicate at least one of: information of the second downlink BWP, or information of an uplink BWP corresponding to the second downlink BWP.

10. The terminal device according to claim 9, wherein the second uplink signal comprises at least one of: index information of the second downlink BWP; or index information of the uplink BWP corresponding to the second downlink BWP.

11. The terminal device according to claim 9, wherein said computer program codes are further configured to, when executed by the processor, cause said terminal device to:
send the second uplink signal on the uplink BWP corresponding to the second downlink BWP.

12. The terminal device according to claim 9, wherein said computer program codes are further configured to, when executed by the processor, cause said terminal device to:
send the second uplink signal on the uplink BWP corresponding to the second downlink BWP according to a second correspondence, wherein the second uplink signal corresponds to index information of the second downlink BWP, the second correspondence is a correspondence between a plurality of pieces of uplink information and indexes of the plurality of downlink BWPs, and the plurality of pieces of uplink information comprise the second uplink signal.

13. The terminal device according to claim 9, wherein said computer program codes are further configured to, when executed by the processor, cause said terminal device to:
receive configuration information of the second uplink signal.

14. The terminal device according to claim 13, wherein said computer program codes are further configured to, when executed by the processor, cause said terminal device to:
in response to that a measurement result of a downlink reference signal corresponding to the first downlink BWP is smaller than a third threshold, receive the configuration information of the second uplink signal.

15. The terminal device according to claim 9, wherein there is a first period of time between a start time when the terminal device switches from the first downlink BWP to the second downlink BWP and a start time when the second uplink signal is sent.

16. The terminal device according to claim 8, wherein said computer program codes are further configured to, when executed by the processor, cause said terminal device to:
 periodically measure the plurality of downlink reference signals corresponding to the plurality of downlink BWPs.

17. The terminal device according to claim 16, wherein measurement periods for the plurality of downlink reference signals corresponding to the plurality of downlink BWPs are preset, or the measurement periods for the plurality of downlink reference signals corresponding to the plurality of downlink BWPs are pre-configured by a network device through a signaling.

* * * * *